(12) United States Patent
Azar et al.

(10) Patent No.: US 10,237,563 B2
(45) Date of Patent: Mar. 19, 2019

(54) SYSTEM AND METHOD FOR CONTROLLING VIDEO ENCODING USING CONTENT INFORMATION

(71) Applicant: Nvidia Corporation, Santa Clara, CA (US)

(72) Inventors: Hassane S. Azar, Santa Clara, CA (US); Bryan Dudash, Seattle, WA (US); Rochelle Pereira, Santa Clara, CA (US); Dawid Pajak, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 793 days.

(21) Appl. No.: 13/711,358

(22) Filed: Dec. 11, 2012

(65) Prior Publication Data

US 2014/0161173 A1     Jun. 12, 2014

(51) Int. Cl.
*H04N 7/00* (2011.01)
*H04N 19/20* (2014.01)

(52) U.S. Cl.
CPC .................................. *H04N 19/20* (2014.11)

(58) Field of Classification Search
CPC ........................................................ H04N 7/26
USPC ..................................................... 375/240.01
See application file for complete search history.

(56) References Cited

U.S. PATENT DOCUMENTS

| 7,324,594 B2 * | 1/2008 | Lamboray | G06T 9/00 |
| | | | 348/E13.062 |
| 2003/0007488 A1 * | 1/2003 | Rao | H04L 29/06027 |
| | | | 370/390 |
| 2003/0122942 A1 | 7/2003 | Parker et al. | |
| 2004/0095999 A1 | 5/2004 | Piehl et al. | |
| 2006/0056717 A1 | 3/2006 | Cheung et al. | |
| 2007/0036227 A1 | 2/2007 | Ishtiaq | |
| 2007/0081211 A1 * | 4/2007 | Tange | G11B 7/00736 |
| | | | 359/24 |
| 2007/0268964 A1 | 11/2007 | Zhao | |
| 2009/0097543 A1 | 4/2009 | Pan et al. | |
| 2010/0295847 A1 | 11/2010 | Titus | |
| 2011/0276863 A1 * | 11/2011 | Bhise et al. | 715/201 |

(Continued)

FOREIGN PATENT DOCUMENTS

| CN | 1781311 A | 5/2006 |
| CN | 101345870 A | 1/2009 |

(Continued)

OTHER PUBLICATIONS

Chen, L-Q., et al. "A Visual Attention Model for Adapting Images on Small Displays," Multimedia Systems, Oct. 2003, 12 pages.

(Continued)

*Primary Examiner* — Jonathan R Messmore

(57) ABSTRACT

A system and method are provided for a 3D modeling system with which an encoded video stream is produced. The system includes a content engine, an encoder, and a fixed function engine. The fixed function engine receives content information from the content engine. The fixed function engine produces encoder information from the content information. The encoder uses the encoder information to produce an encoded video stream having at least one of a higher quality and a lower bandwidth than a video stream encoded without the encoder information.

20 Claims, 2 Drawing Sheets

(56) References Cited

U.S. PATENT DOCUMENTS

| | | | |
|---|---|---|---|
| 2013/0054835 A1* | 2/2013 | Sliger | H04L 69/04 709/247 |
| 2014/0092209 A1 | 4/2014 | Azar et al. | |
| 2014/0292751 A1 | 10/2014 | Azar | |

FOREIGN PATENT DOCUMENTS

| | | |
|---|---|---|
| CN | 102129698 A | 7/2011 |
| CN | 102238374 A | 11/2011 |
| CN | 102637302 A | 8/2012 |
| JP | 2003204436 A | 7/2003 |
| JP | 2008113292 A | 5/2008 |

OTHER PUBLICATIONS

Rahimi, H., et al. "Activity-Centric Streaming of Virtual Environments and Games to Mobile Devices," 2011 IEEE International Workshop, Haptic Audio Visual Environments and Games (HAVE), 6 pages.

Wang, Y., et al., "An Attention Based Spatial Adaptation Scheme for H.264 Videos on Mobiles," Multi-Media Modelling Conference Proceedings, 2006, IEEE, 7 pages.

Wandell, Brian A. "Chapter 2: Image Formation." Foundations of Vision. 1st Ed. Sinauer Associates Inc. ISBN-13: 978-0878938537, May 1995. 29 pages.

Foreign Communication From a Related Counterpart Application, German Application No. 10 2013 015 821.4 German First Examination Report dated Jan. 7, 2015, 10 pages.

Martinez, J.L.; et al, "Efficient WZ-to-H264 Transcoding Using Motion Vector Information Sharing", IEEE International Conference on Multimedia and Expo, pp. 1394 to 1397, Jun. 28, 2009 to Jul. 3, 2009.

Oh, Han, et al, "H.264-Based Depth Map Sequence Coding Using Motion Information of Corresponding Texture Video", Proceedings of the First Pacific Rim conference on Advances in Image and Video Technology (PSIVT'06), pp. 898 to 907, 2006.

Daribo, Ismael, et al., "Arbitrarily Shaped Sub-Block Motion Prediction in Texture Map Compression Using Depth Information",Picture Coding, Symposium (PCS), 2012, pp. 121 to 124, May 7 to 9, 2012.

Grewatsch, Stefan, et al., "Sharing of Motion Vectors in 3D Video Coding", International Conference on Image Processing, vol. 5, pp. 3271 to 3274, Oct. 24 to 27, 2004.

Daribo, Ismael, et al. "Motion Vector Sharing and Bitrate Allocation for 3D Video-Plus-Depth Coding", EURASIP Journal on Advances in Signal Processing, vol. 2009, Article ID 258920, 2009.

Cheung, Gene, et al., "Fast H.264 Mode Selection Using Depth Information for Distributed Game Viewing", Society of Photo—Optical Instrumentation Engineers (SPIE) Conference Series, vol. 6822, 2008.

* cited by examiner

SYSTEM AND METHOD FOR CONTROLLING VIDEO ENCODING USING CONTENT INFORMATION

TECHNICAL FIELD

This application is directed, in general, to computer-generated video and, more specifically, to a system and method for controlling video encoding that uses content information.

BACKGROUND

The video technology deployed in many consumer and professional devices relies upon one or more video processors to produce video signals for display. This is true for video game applications, as well as for applications that provide menus and/or other user interface elements having a three-dimensional, or "3D," appearance.

One of the more popular features for incorporation into modern video processors is the implementation of powerful real-time video compression. In very general terms, video compression, or video encoding, compares one frame to the next and sends only the differences between frames. Such encoding works well if the video has small amounts of motion. A still frame of text, for example, can be repeated with very little transmitted data. However, if the video has with more motion, more pixels change from one frame to the next, and thus, the video compression scheme must send more data to keep up with the larger number of pixels that are changing.

Often, the most compelling video content may have extensive differences between frames (e.g., large amounts of motion, explosions, etc.). A very powerful video processing architecture is typically required to handle such intense video. Such video often has a great deal of high frequency detail and, in order to maintain frame rate, the video processor either decreases the quality of the video or increases the bit rate of the video to render this added information with the same level of detail as in previous frames.

SUMMARY

One aspect provides 3D modeling system producing an encoded video stream. The system includes a content engine, an encoder, and a fixed function engine. The fixed function engine is configured to receive content information from the content engine. The fixed function engine is also configured to produce encoder information from the content information. The encoder is configured to use the encoder information to produce an encoded video stream having at least one of a higher quality and a lower bandwidth than a video stream encoded without the encoder information.

Another aspect provides method of producing an encoded video stream. The method includes receiving in a fixed function engine content information from a content engine. The method also includes producing in the fixed function engine encoder information, the encoder information based on the content information. The method further includes encoding a video stream based on the encoder information, wherein the encoded video stream has at least one of a higher quality and a lower bandwidth than a video stream encoded without the encoder information.

Yet another aspect provides a non-transitory, computer-readable medium that stores instructions. When executed by a processing system, the instructions cause the processing system to encode a video stream. Steps performed by the processing system include receiving in a fixed function engine content information from a content engine. The steps also include producing in the fixed function engine encoder information, the encoder information based on the content information. The steps further include encoding a video stream based on the encoder information, wherein the encoded video stream has at least one of a higher quality and a lower bandwidth than a video stream encoded without the encoder information.

BRIEF DESCRIPTION

Reference is now made to the following descriptions taken in conjunction with the accompanying drawings, in which.

DETAILED DESCRIPTION

It is realized herein that conventional video compression is most often performed "on-the-fly," without advance knowledge of the content of the video frames being compressed. It is further realized herein that advance knowledge of frame content may provide valuable insight to a video compression technique or circuit as to how it may more advantageously or effectively perform compression. Accordingly, it is realized herein that advance knowledge, herein called "hints," may be provided to a video compression process and employed in various ways to increase compression or the speed at which it is carried out.

Figure 1:
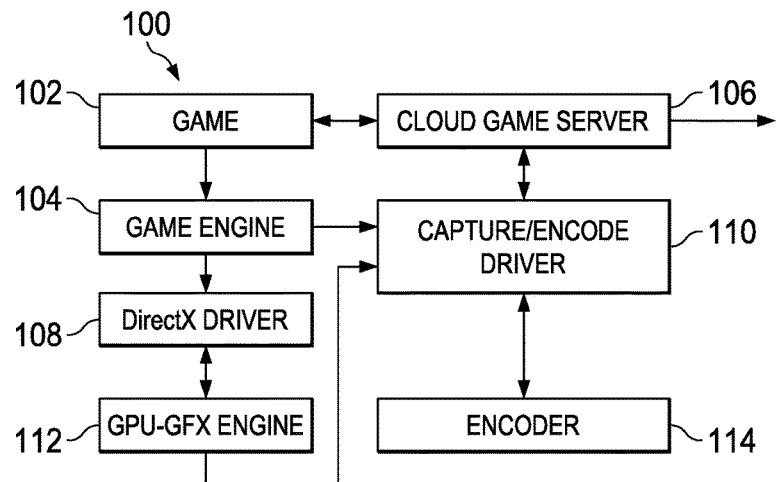
FIG. 1 is a block diagram of a game system according to the disclosure.

FIG. 1 is a block diagram of a game system 100 according to the disclosure. While the present disclosure describes a game system, it will be understood that aspects of the disclosure may be found in other 3D modeling systems producing an encoded video stream.

A game application 102 or other application uses a game engine 104 (or content engine) to produce, inter alia, a 3D model (or scene file). The content engine 104 may provide real-time processing functionality for playing a video game, such as user input/output, a physics engine, animation, artificial intelligence, a scene graph, and other functions. The 3D model may include information such as geometry, viewpoint, texture, lighting, and shading information in a description of a virtual scene.

The scene file and other required information are provided to a GPU-GFX engine 112 via a DirectX driver 108 (or other suitable driver) for rendering. In other embodiments, other suitable rendering engines may be used. The renderer produces a two-dimensional (2D) image that corresponds to the scene file and other information received from the content engine 104. Typically the renderer produces new 2D images at a rate suitable for a video display.

In embodiments such as a game console or personal computer (PC) game, the game application 102 may communicate with a user (player) directly via hardware and software of the game console or PC. In the embodiment depicted in FIG. 1, the game application 102 communicate with one or more users via a game server 106. The server 106 may be a cloud server or other suitable server application.

The server 106 uses a capture/encode (CE) driver 110 to obtain a stream of encoded frames of video for sending to the one or more users. The CE driver 110 captures a stream of rendered frames from the GPU-GFX engine 112, uses an encoder 114 to encode the rendered frames, and provides the encoded video stream to the server 106. The video stream is suitable for immediate viewing on a video display device or for recording on an analog or digital recording medium for later viewing.

The CE driver 110 receives content information from the content engine 104 for use in the encoding process. The CE driver 110 processes the received content information to produce encoder hints that the encoder 114 uses to speed the encoding process and produce an encoded video stream having higher quality and/or requiring less bandwidth to transmit to the one or more users.

A 3D modeling system according to the disclosure, such as the game system 100, may be implemented in many different forms of hardware. For simple 3D models, the system 100 may be implemented in a single processor system. More typically, a system according to the disclosure will be implemented in a multiprocessor system providing dedicated graphics processing support. Such a multiprocessor system may include a host processor controlling one or more graphics processing units providing multiple processors (or multiprocessing units).

The content information provided to the CE driver 110 may take on several forms. Some content information (type CI1) may include a camera location from which the renderer is to generate its 2D images and a projection matrix that represents geometric mapping of the 3D model into a 2D image. Other content information (type CI2) may include z-buffer information relating to a frame currently being rendered. Still other content information (type CI3) may include a luminance ramp for a frame currently being rendered. Other content information (type CI4) may include a mask (one bit per pixel) identifying pixels in the frame being rendered that will be overlaid (or composited) with an alternate content region such as a text box, dialog box, or other user interface element.

Content information types CI1-CI4 are only representative examples. In other embodiments, the content engine 104 may provide other types of content information to the CE driver 110.

When functionality such as content information-based encoding (CIE) is added to a system, typically an application programming interface (API) is defined, to enable programmers to make use of the functionality. In some systems providing CIE, the associated API may include a function call for each of the content information types CI1, CI2, CI3, and CI4. Each function call may have a list of parameters unique to its content information type. As further types of content information are developed, new function calls with individual lists of parameters may be added to the API. A programmer using the system's CIE functionality is required to learn or look up each of the different function calls when programming the system.

Figure 2:
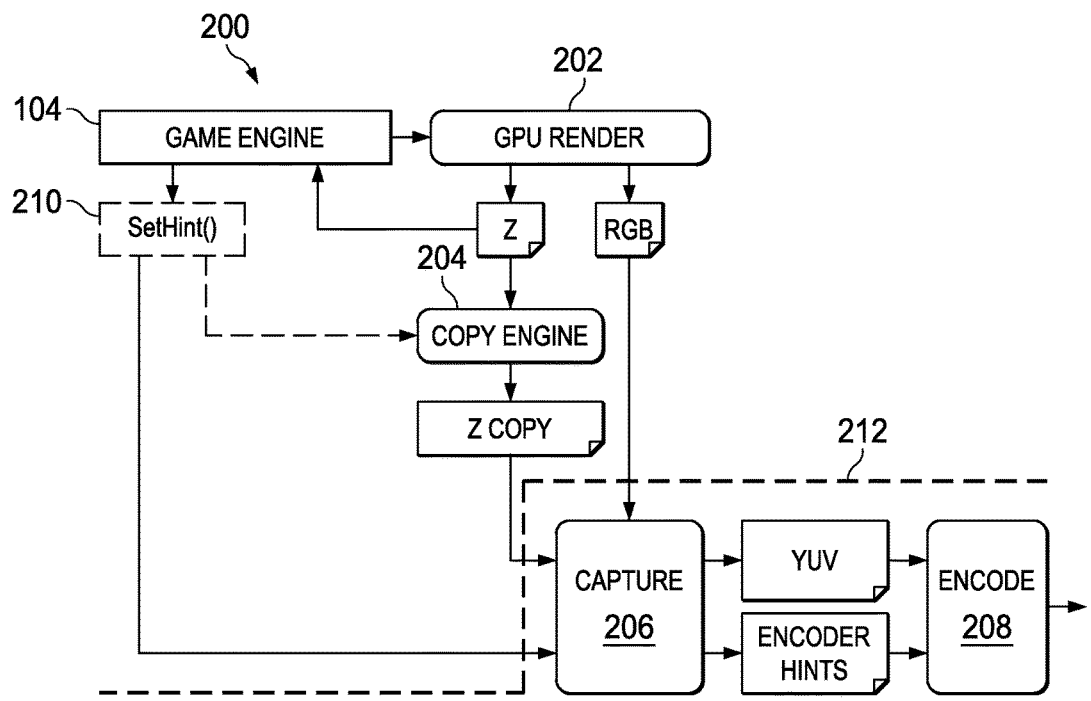
FIG. 2 is a block diagram of a portion of a first game system according to the disclosure.

FIG. 2 is a block diagram of a portion of a first game system 200 according to the disclosure. As described with reference to FIG. 1, the game engine 104 (or content engine) sends a scene file and other information to a GPU renderer 202. The renderer 202 may execute on the GPU-GFX engine 112. The renderer produces, inter alia, a stream of red-green-blue (RGB) frames and associated z-buffers. The content engine 104 may use the x-buffers.

When a programmer of the content engine 104 reaches a point in the program at which content information may be sent to facilitate encoding, a call to a function SetHint( ) 210 is placed in the content engine 104 program. The SetHint( ) function 210 provides a simpler and less complex API for the CIE functionality of the system 200 than the multiplicity of function calls described above.

The definition of the SetHint( ) function 210 call is:

int SetHint(enum HINT_ID id, void *hints, int hintsize);

where id is an identifier of the type of content information being provided (e.g., CI1, CI2, etc.), hints is a pointer to a data structure containing the content information, and hintsize is a size of the hints data structure.

The format of the SetHint( ) function call 210 provides several benefits. It provides a single, easy-to-remember function call and parameter list structure to use for sending all types of content information to the encoder. It provides a function call format that need not change when additional types of content information are designed and implemented in the future. The design of the SetHint( ) function call 210 places fewer cognitive barriers in the way of a programmer seeking to use the CIE functionality of the system 200 to improve the encoding performance of an application.

Returning to FIG. 2, the actions of the SetHint( ) function 210 when called for content information of type CI2 (z-buffer information) are shown. When called with content information of type CI2, a pointer to the z-buffer that is produced by the GPU renderer 202 is among the information in the hints data structure. In order to avoid the GPU renderer 202 changing the values in the z-buffer while they are being used for performing CIE functions, the values are copied and the copy is provided to a capture function 206.

In some embodiments, a SetHint( ) function may only copy the z-buffer values in line, before returning to the program of the content engine 104. Such copying at the application level, however, may be inefficient and may occupy processor cycles that the programmer would prefer were available for the content engine 104 and/or the GPU renderer 202.

In the embodiment shown in FIG. 2, the SetHint( ) function 210 activates a copy engine 204 to copy the z-buffer for use by the capture function 206. The SetHint( ) function 210 activates a copy engine 204 by providing information that includes a pointer to the z-buffer. The copy engine 204 is a fixed function engine provided be an operating system of the system 200. Because the copy engine 204 is an OS level function, it is more efficient than a copy performed at the application level and uses fewer processor cycles. This is one example of the CIE API of the current disclosure providing low latency—that is, a quicker return from the SetHint( ) function call 210 to a calling program, and fewer processor cycles used in performing the SetHint( ) function 210.

The SetHint( ) function 210 also provides any additional data having a small data size directly to the capture function 206 for use along with the z-buffer information. The capture function 206 also receives the current RGB buffer produced by the GPU renderer 202 and produces two outputs for use by an encoder 208. The capture function 206 produces a YUV buffer that corresponds to the RGB buffer. The capture function 206 also produces an encoder hints (or encoder information) data structure that corresponds to the z-buffer information.

When processing CI2-type content information, the capture function 206 performs an edge detection algorithm on the z-buffer to identify edges in the RGB buffer image. The capture function 206 then prepares encoder information that cause the encoder 208 to devote more processor cycles and bits of the encoded image to the portions of the image around the edges than to other portions of the image, since the human visual system is more sensitive to edges.

In processing other types of content information, the capture function 206 may receive information only from the SetHints( ) function 304, or from additional or alternative sources than the copy engine 204.

A dashed line 212 is used in FIG. 2 to indicate that some functions in the system may run as part of a first process, while other function run as part of a second process. Functions above the dashed line 212 run as part of the first process, which may generate the video stream at a rate of 80 frames per second (fps). Functions below the dashed line 212 run as part of the second process, which processes the video stream at a rate of 60 fps.

Thus, in the system 200, there is further a synchronization mechanism in operation, by which the capture function 206 may confirm that the copy engine 204 has completed the copy of the z-buffer before processing the z-buffer to produce the encoder information. In other embodiments, the elements of the system 200 may be differently distributed between the two processes, the elements may run as part of any other number of processes, and/or the processes may operate at any other suitable frame rate.

Figure 3:
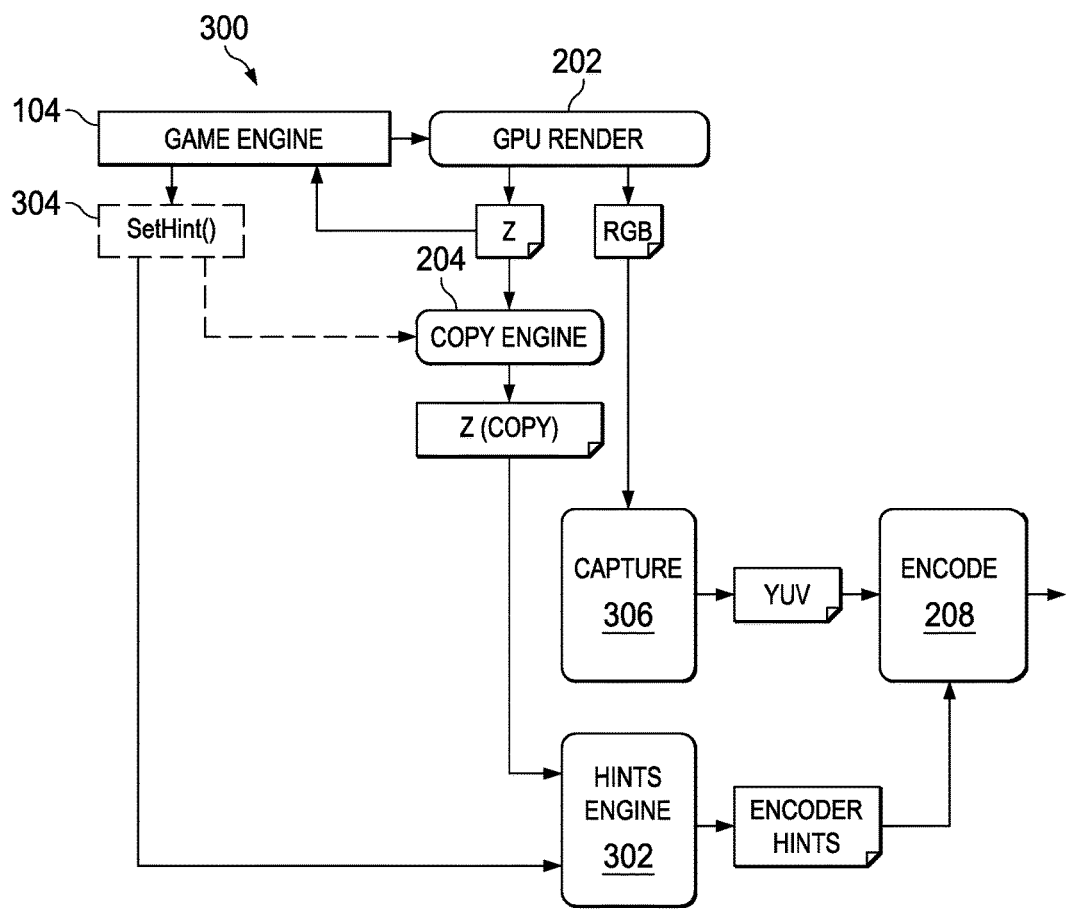
FIG. 3 is a block diagram of a portion of a second game system according to the disclosure.

FIG. 3 is a block diagram of a portion of a second game system 300 according to the disclosure. The system 300 provides even lower latency and uses even fewer processor cycles than the system 200, described with reference to FIG. 2.

The system 300 includes a hints engine 302 (or encoder information engine) that receives the z-buffer copy from the copy engine 204 and any additional content information from a SetHint( ) function 304. The encoder information engine 302 then produces the encoder information (encoder hints) used by the encoder 208.

Like the copy engine 204, the encoder information engine 302 is a fixed function engine implemented at the OS level. Where the capture function 206 of the system 200 shown in FIG. 2 produces encoder information using application level processing, the encoder information engine 302 operates at the OS level, executing more quickly and using fewer processor resources. In this way the CEI API of the system 300 provides even lower latency than the API of the system 200 shown in FIG. 2.

In processing other types of content information, the encoder information engine 302 may receive information only from the SetHints( ) function 304, or from additional or alternative sources than the copy engine 204.

While the system 200 and the system 300 have been described with reference to content information of type CI@, it will be understood that the system 200 and the system 300 may further include other or additional fixed function engines or other processing techniques to reduce a processing load of CIE functionality on a processor that is also running the game engine 104 (or content engine), the GPU renderer 202, and other high-level functions of a 3D modeling system.

Those skilled in the art to which this application relates will appreciate that other and further additions, deletions, substitutions and modifications may be made to the described embodiments.

What is claimed is:

1. A 3D modeling system producing an encoded video stream, the system comprising:
   a content engine;
   an encoder configured to perform an encoding process to produce encoded video streams; and
   a fixed function engine configured to receive content information from the content engine and produce encoder information that the encoder employs to accelerate the encoding process and produce an encoded video stream having at least one of a higher quality and a lower bandwidth than one encoded without the encoder information, wherein the content information includes z-buffer information of a frame.

2. The system as recited in claim 1, wherein said content engine employs
   an application programming interface (API) function to send the content information to the fixed function engine, wherein the content engine passes to the API function information that includes:
   an identifier of a type of the content information;
   a pointer to the content information; and
   a size of the content information.

3. The system as recited in claim 1, wherein the fixed function engine includes a copy engine that is configured to copy a portion of the content information using OS level processing for producing the encoder information.

4. The system as recited in claim 2, wherein the API function is configured to send a first portion of the content information to the copy engine and a second portion of the content information to the fixed function engine.

5. The system as recited in claim 1 further comprising a capture function configured to use the copied portion of the content information to produce the encoder information using application level processing.

6. The system as recited in claim 2, wherein the fixed function engine further comprises an encoder information engine configured to use the copied portion of the content information to produce the encoder information, wherein said encoder information engine is implemented at an OS level.

7. The system as recited in claim 6, wherein the API function is configured to send a first portion of the content information to the copy engine and a second portion of the content information to the encoder information engine.

8. A method of producing an encoded video stream, the method comprising:
   receiving in a fixed function engine content information from a content engine;
   producing in the fixed function engine encoder information, the encoder information based on the content information; and
   encoding a video stream based on the encoder information, wherein said encoder information accelerates said encoding to produce the encoded video stream that has at least one of a higher quality and a lower bandwidth for transmission than one encoded without the encoder information, wherein the content information includes z-buffer information of a frame.

9. The method as recited in claim 8, further comprising:
   receiving the content information via an application programming interface (API) function called by the content engine, wherein the received content information includes:
   an identifier of a type of the content information;
   a pointer to the content information; and
   a size of the content information.

10. The method as recited in claim 8, wherein said receiving includes copying a portion of the content information using OS level processing for said producing and said copying is carried out by a copy engine.

11. The method as recited in claim 10, further comprising:
    sending a first portion of the content information to the copy engine; and
    sending a second portion of the content information to the fixed function engine.

12. The method as recited in claim 8, wherein the encoder information is produced in a capture function using application level processing.

13. The method as recited in claim 10, wherein the encoder information is produced in an encoder information engine that is implemented at an OS level.

14. The method as recited in claim 13, further comprising:
sending a first portion of the content information to the copy engine; and
sending a second portion of the content information to the encoder information engine.

15. A non-transitory, computer-readable medium storing instructions that, when executed by a processing system, cause the processing system to produce an encoded video stream, by performing the steps of:
receiving in a fixed function engine content information from a content engine;
producing in the fixed function engine encoder information, the encoder information based on the content information; and
encoding a video stream based on the encoder information, wherein said encoder information accelerates said encoding to produce the encoded video stream that has at least one of a higher quality and a lower bandwidth for transmission than one encoded without the encoder information, wherein the content information includes z-buffer information of a frame.

16. The computer-readable medium as recited in claim 15, wherein the steps further comprise:
receiving the content information via an application programming interface (API) function called by the content engine, wherein the received content information includes:
an identifier of a type of the content information;
a pointer to the content information; and
a size of the content information.

17. The computer-readable medium as recited in claim 15, wherein said receiving includes copying a portion of the content information using OS level processing for said producing.

18. The computer-readable medium as recited in claim 15, wherein the steps further comprise:
sending a first portion of the content information to a copy engine; and
sending a second portion of the content information to the fixed function engine.

19. The computer-readable medium as recited in claim 15, wherein the encoder information is produced in a capture function of the processing system using application level processing.

20. The computer-readable medium as recited in claim 15, wherein the encoder information is produced in an encoder information engine that is implemented at an OS level.

\* \* \* \* \*